(12) United States Patent
Kim et al.

(10) Patent No.: US 10,812,453 B2
(45) Date of Patent: Oct. 20, 2020

(54) METHOD FOR TRANSMITTING ENCRYPTED PACKET IN COMMUNICATION SYSTEM

(71) Applicant: KOREA ADVANCED INSTITUTE OF SCIENCE AND TECHNOLOGY, Yuseong-gu Daejeon (KR)

(72) Inventors: Myung Chul Kim, Yuseong-gu Daejeon (KR); Kyung Min Go, Yuseong-gu Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 267 days.

(21) Appl. No.: 15/758,071

(22) PCT Filed: Dec. 14, 2015

(86) PCT No.: PCT/KR2015/013639
§ 371 (c)(1),
(2) Date: Mar. 7, 2018

(87) PCT Pub. No.: WO2017/043702
PCT Pub. Date: Mar. 16, 2017

(65) Prior Publication Data
US 2018/0255029 A1    Sep. 6, 2018

(30) Foreign Application Priority Data

Sep. 9, 2015 (KR) .................. 10-2015-0127541

(51) Int. Cl.
*H04L 29/06* (2006.01)
*H04N 21/2347* (2011.01)
(Continued)

(52) U.S. Cl.
CPC .......... *H04L 63/0428* (2013.01); *H04L 69/22* (2013.01); *H04N 21/235* (2013.01);
(Continued)

(58) Field of Classification Search
CPC . H04L 63/0428; H04L 69/22; H04L 63/0272; H04L 63/166; H04L 29/06;
(Continued)

(56) References Cited

U.S. PATENT DOCUMENTS

| 4,319,225 A | * | 3/1982 | Klose ..................... H03M 7/40 341/51 |
| 6,119,170 A | * | 9/2000 | Schoffelman ....... H04L 12/5692 709/213 |

(Continued)

FOREIGN PATENT DOCUMENTS

| JP | 2010-176691 A | 8/2010 |
| KR | 10-0799305 B1 | 1/2008 |

(Continued)

OTHER PUBLICATIONS

International Search Report dated Jun. 29, 2016 on related PCT Application No. PCT/KR2015/013639, filed Dec. 14, 2015.

*Primary Examiner* — Ashokkumar B Patel
*Assistant Examiner* — Quazi Farooqui
(74) *Attorney, Agent, or Firm* — EIP US LLP (57) ABSTRACT

Provided is a method for transmitting a packet in a communication system, comprising the steps of: identifying the packet according to a packet identification criterion; reallocating frames included in the identified packet and encrypting the packet in which the frames have been rearranged; and transmitting the encrypted packet.

9 Claims, 9 Drawing Sheets

(51) Int. Cl.
*H04N 21/235* (2011.01)
*H04N 21/647* (2011.01)
*H04N 21/2389* (2011.01)

(52) U.S. Cl.
CPC ... *H04N 21/2347* (2013.01); *H04N 21/23895* (2013.01); *H04N 21/64715* (2013.01); *H04L 63/0272* (2013.01); *H04L 63/166* (2013.01)

(58) Field of Classification Search
CPC ....... H04N 21/23895; H04N 21/64715; H04N 21/235; H04N 21/2347
USPC ......................................................... 380/255
See application file for complete search history.

(56) References Cited

U.S. PATENT DOCUMENTS

| | | | | |
|---|---|---|---|---|
| 8,826,351 B2* | 9/2014 | Li | ............................ | H04N 5/76 |
| | | | | 725/100 |
| 9,264,652 B2* | 2/2016 | Smith | ............... | H04N 21/44204 |
| 9,438,618 B1* | 9/2016 | Sultan | ................. | H04L 63/1433 |
| 2003/0202527 A1* | 10/2003 | Nahapetian | ............. | H03M 7/30 |
| | | | | 370/412 |
| 2012/0198241 A1* | 8/2012 | O'Hare | ................... | G06F 21/32 |
| | | | | 713/189 |
| 2013/0091350 A1* | 4/2013 | Gluck | ................. | H04L 63/0471 |
| | | | | 713/153 |
| 2013/0279585 A1* | 10/2013 | Shen | ....................... | H04N 19/89 |
| | | | | 375/240.15 |
| 2015/0271145 A1* | 9/2015 | Jalisatgi | .............. | H04L 63/0428 |
| | | | | 713/168 |

FOREIGN PATENT DOCUMENTS

| | | |
|---|---|---|
| KR | 10-2010-0065017 A | 6/2010 |
| KR | 10-0984983 B1 | 10/2010 |
| KR | 10-2011-0061505 A | 6/2011 |
| KR | 10-1468082 B1 | 11/2014 |

* cited by examiner

| Importance | Description |
|---|---|
| High | Metadata associated with video streaming (e.g.:PAT of MPEG-2 TS, PMT of MPEG-2 TS, SEI of H.264/AVC, MPD of HEVC/H.265) ~210 |
| High | Metadata associated with encoded video data (e.g.: SPS, PPS, video frame header) ~220 |
| High | Encoded video data storing complete scene information (e.g.: I-frame data) ~230 |
| Low | Encoded video data storing video data referred to by portion of other frames (e.g.: P-frame data) ~240 |
| Low | Encoded video data storing video data not referred to by other frames (e.g.: B-frame data) ~250 |

METHOD FOR TRANSMITTING ENCRYPTED PACKET IN COMMUNICATION SYSTEM

BACKGROUND OF THE INVENTION

Field of the Invention

Example embodiments relate to a method of selectively reallocating video packets based on an significance in the range of video frames, for example, a group of pictures, having a cross-reference relationship, and selectively performing an encrypted transmission and a non-encrypted transmission of the reallocated video packets based on an significance to resolve issues, for example, an illegal image acquisition and exposure of personal information, which may occur during a video transmission on a mobile device with limited available resources.

Description of the Related Technology

Recently, the amount of mobile video uses is continuously increased such as YouTube, personal broadcasting, and real-time surveillance. In particular, the video usage of remote surveillance devices, which are represented by closed-circuit television (CCTV), is significantly increasing due to the admissibility of evidence in court.

However, because the remote surveillance devices having been operated in an existing closed network are connected to a public network, such as the Internet, for system management and user convenience, there are concerns about issues, such as an illegal image acquisition by an unauthorized third party when transmitting an acquired image and exposure of personal information. For example, if an operation right of a remote surveillance device is hacked through the Internet, a control right for a system of the corresponding remote surveillance device can be acquired, an acquired image and a transmission target of the acquired image may be arbitrarily manipulated. Also, although a system operation right is not acquired, an image may be acquired through eavesdropping on a video being transmitted. In this case, the image may be continuously accessed without trace of intrusion from a corresponding device. In particular, in a case in which the image is acquired through eavesdropping, the seriousness may further grow in that a method of transmitting data wirelessly using a broadcasting scheme is generally employed and an image may be acquired from an unmanned arterial vehicle (UAV) operated by an army or a public CCTV of a daycare center, using simple monitoring equipment.

To prevent this, a number of video transmission schemes have been proposed with full or partial encryption of target video. Herein, encryption refers to converting the target video to a format that cannot be viewed by an unauthorized third party, using an encryption algorithm, such as, an advanced encryption standard (AES).

Initially, a full video encryption method provides the highest level of security. However, a large amount of computing power is required for the encryption, which may significantly increase according to an increase in a size of an image to be transmitted. Accordingly, many remote surveillance devices, such as, an unmanned drone and a CCTV, having relatively low-computing power transmit an image without using an encryption process.

To outperform the issues found in the full video encryption method, a selective encryption methods for selectively encrypting important data through a video analysis have been proposed. However, the existing proposed selective encryption methods may have the following constraints. Initially, the selective encryption method has a relatively low level of security compared to the full video encryption method since only a specific portion is encrypted and transmitted due to the limited computing power of a mobile device. In particular, if a size of data to be encrypted is inconstant, a stream-based encryption method, for example, a stream cipher, needs to be used instead of using a block-based encryption method, for example, a block cipher, which leads to further degrading the security. Further, mobile devices have various system specifications according to the purposes of the mobile devices and have different computational power. Due to an encryption transmission characteristic of generating additional load in a system, an encryption transmission method suitable for the computational power of each device is required. However, in the existing selective transmission methods, it is difficult to quantify a video to be encrypted and thus, the above suggestion may be inapplicable. Further, when an encryption target is to be selected by directly analyzing an encoded video, additional computational overhead is required. When encryption is to be performed by considering, for example, motion vectors, coefficients, and quantization parameters of a video, an amount of an original video to be analyzed for encryption increases. Considering that a "shoot-record-encrypt-transmit" function is generally performed in a single remote surveillance device, a decrease in additional computational load is important for a smooth operation of surveillance devices.

SUMMARY

Examples

Example embodiments provide a packet transmission method of a communication system that may identify a packet based on header information of the packet and may selectively encrypt the packet based on an importance of the identified packet.

Example embodiments also provide a packet transmission method of a communication system that may selectively encrypt the identified packet based on header information, and an available resource amount of a communication system.

Example embodiments also provide a packet transmission method of a communication system that may selectively rearrange frames having a cross-reference relationship among the entire frames included in a packet.

Example embodiments also provide a packet reception method of a communication system that may determine whether decryption of a packet is required and may selectively decrypt the packet based on a packet identification criterion.

Solutions

According to an aspect, there is provided a packet transmission method of a communication system, the method including identifying a packet based on a packet identification criterion; reallocating frames included in the identified packet, and encrypting the packet in which the frames are rearranged; and transmitting the encrypted packet.

According to an aspect, there is provided a packet reception method of a communication system, the method including determining whether decryption of a packet is required based on a packet identification criterion of the packet;

decrypting the packet based on the packet identification criterion when the decryption of the packet is determined to be required; and reallocating frames of the packet.

According to an aspect, there is provided a packet transmission apparatus of a communication system, including a processor configured to determine whether to perform a packet identification process or a packet encryption process based on a remaining system resource amount and to identify a packet based on a packet identification criterion when the packet identification process and the packet encryption process are determined to be performed; an encoder configured to rearrange frames of the packet based on a result of identifying the packet and to encrypt the packet in which the frames are rearranged; and a transmitter configured to transmit the encrypted packet.

Effect

According to example embodiments, it is possible to effectively cope with issues, such as an illegal image acquisition by a third party and exposure of personal information, which may occur during a video transmission, based on an available resource amount of a mobile device.

Also, according to example embodiments, if a video observes a network abstraction layer (NAL) header standard defined in image standards, H.264/advanced video coding (AVC) and high efficiency video coding (HEVC)/H.265 standards, and also observes a packet header format defined in an MPEG-2 transport stream (TS) standard, independent application may be performed without modifying existing software and hardware products.

Also, according to example embodiments, application may be performed for an imaging module of an unmanned aerial vehicle (UAV), an image transmission of a closed-circuit television (CCTV) connected to a wired/wireless network, a broadcasting image acquired using a mobile device, a video conference using a personal device, and also may be performed in various fields, for example, a communication, a multimedia transmission and reception, and networking.

DETAILED DESCRIPTION OF CERTAIN INVENTIVE EMBODIMENTS

Best Mode

Various modifications may be made to the example embodiments. However, it should be understood that these embodiments are not construed as being limited to the illustrated forms and include all changes, equivalents or alternatives within the idea and the technical scope of this disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprise/include" and/or "have," when used in this specification, specify the presence of stated features, integers, steps, operations, components, parts or combinations thereof, but do not preclude the presence or addition of one or more other features, integers, steps, operations, components, parts or combinations thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Figure 1:
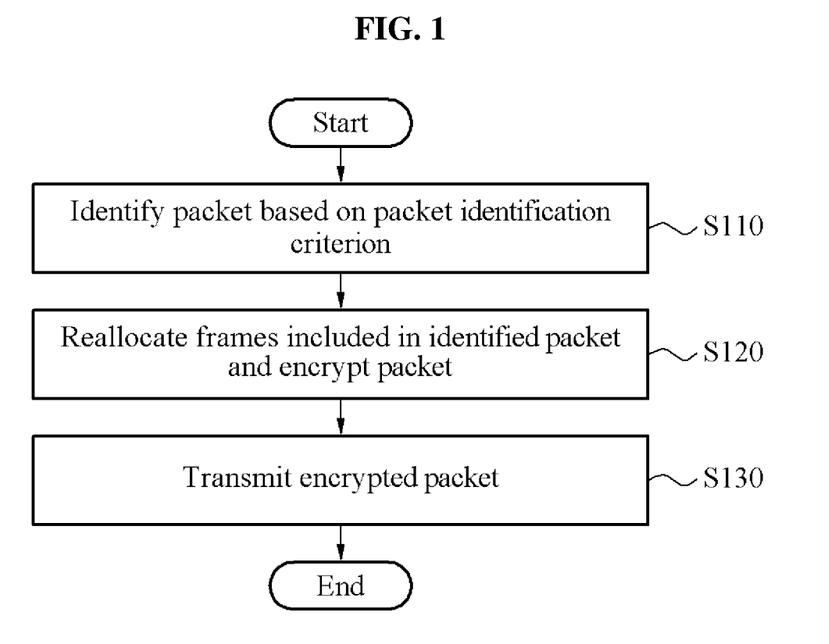
FIG. 1 is a flowchart illustrating an encrypted packet transmission method of a communication system according to an example embodiment.

FIG. 1 is a flowchart illustrating an encrypted packet transmission method of a communication system according to an example embodiment.

In operation S110, the packet transmission method may identify a packet based on a packet identification criterion. The packet identification criterion may be recognized as the same concept as a packet identifier on the communication system and may indicate each of identifiers assigned to packets in a multiplexed transmission flow, respectively. When multiplexing and transmitting a plurality of channel signals using a single transmission line, the communication system may independently compress and packetize each of the channel signals and then may multiplex packets and transmit the multiplexed packets. Here, the same packet identifier (PID) may be assigned to a packets corresponding to a single channel to be distinguished from a packets of another channel.

In operation S120, the packet transmission method may rearrange frames included in the identified packet and may encrypt the packet in which the frames are rearranged. In operation S130, the packet transmission method may transmit the encrypted packet. Once an identified specific packet is encrypted, encryption transmission may be performed by applying an encryption protocol, for example, a secure sockets layer (SSL) protocol or an encryption algorithm, for example, an advanced encryption standard (AES) algorithm. Non-encryption transmission may be performed on a packet corresponding to a packet identification criterion that does not require encryption transmission. Packet rearrangement and encryption will be further described with reference to FIG. 5.

Figure 2:
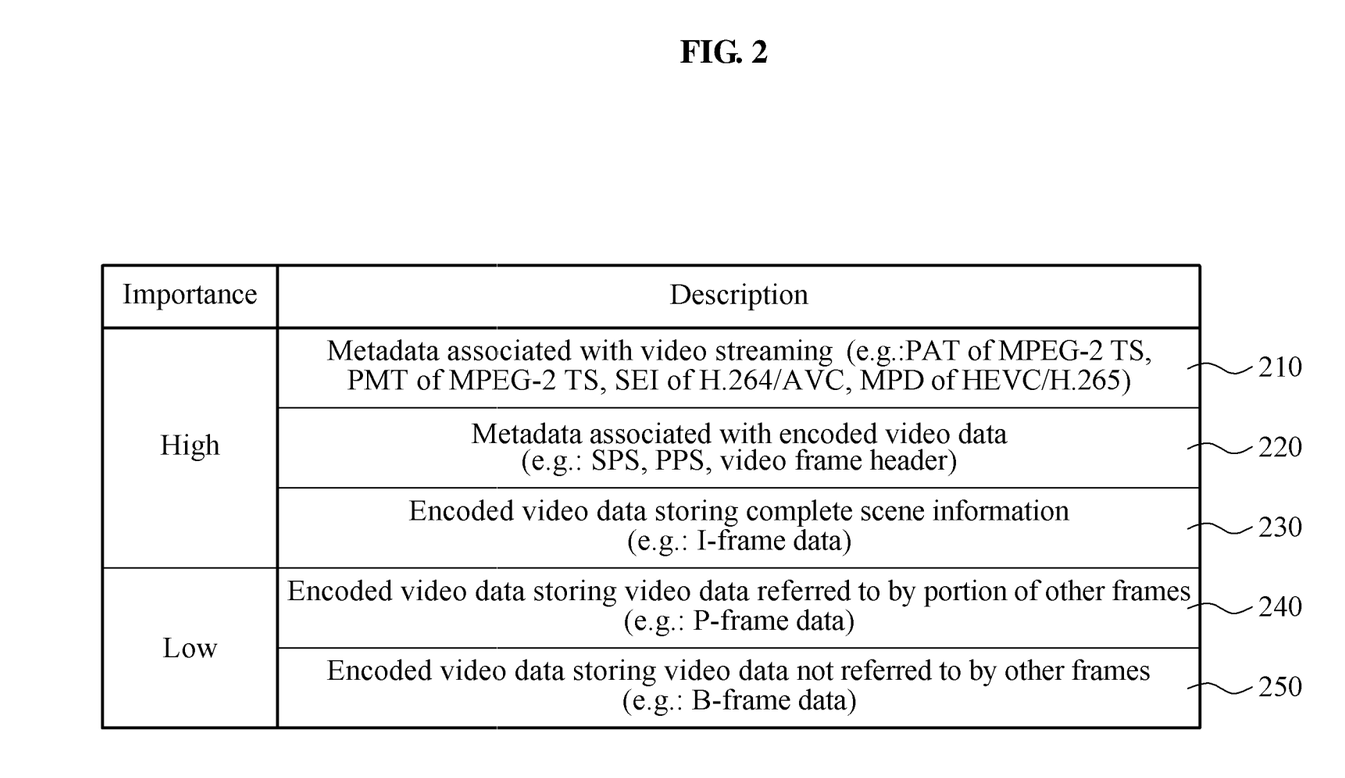
FIG. 2 illustrates an example of classifying an important video packet in the case of observing a network abstraction layer (NAL) header standard defined in an H.264/advanced video coding (AVC) standard and a high efficiency video coding (HEVC)/H.265 standard, and also observing a packet header format defined in an MPEG-2 transport stream (TS) standard according to an example embodiment.

FIG. 2 illustrates an example of classifying an important video packet in the case of observing a network abstraction layer (NAL) header standard defined in an H.264/advanced video coding (AVC) standard and a high efficiency video coding (HEVC)/H.265 standard, and also observing a packet header format defined in an MPEG-2 transport stream (TS) standard according to an example embodiment.

Referring to FIG. 2, according to an example embodiment, a packet identification criterion may be associated with header information of a packet. According to another example embodiment, the packet identification criterion may be associated with a level of security required for transmission of the packet. A packet encryption method of a communication system according to an example embodiment may assign a relatively high importance to metadata associated with video streaming and metadata associated with encoded video and verifiable based on a video packet unit, and may assign a relatively high importance, for example, a first type packet and a second type packet, to an encoded video packet that stores complete scene information, such as I-frame data. In addition, the packet encryption method may assign a relatively low importance, for example, a $(n-1)^{th}$ type packet and an $n^{th}$ type packet, to other video packets, for example, video packets that are referred to by a portion of other frames or not referred to. According to an example embodiment, the header information may be compatible with at least one of a NAL header format of an H.264/AVC standard and a NAL header format of an HEVC/H.265 standard, and may be compatible with a header format of an MPEG-2 TS standard. Classification of important video packets may be used to classify metadata information, such as a program association table (PAT) or a program mapping table (PMT), based on process ID (PID) information that is included in an MPEG-2 TS packet header, or to classify media presentation description (MPD) and a video frame header, etc., based on Nal_Ref_Idc (NRI) and Nal_Unit_Type (NUT) information of a NAL header defined in H.264/AVC or HEVC/H.265.

Figure 3:
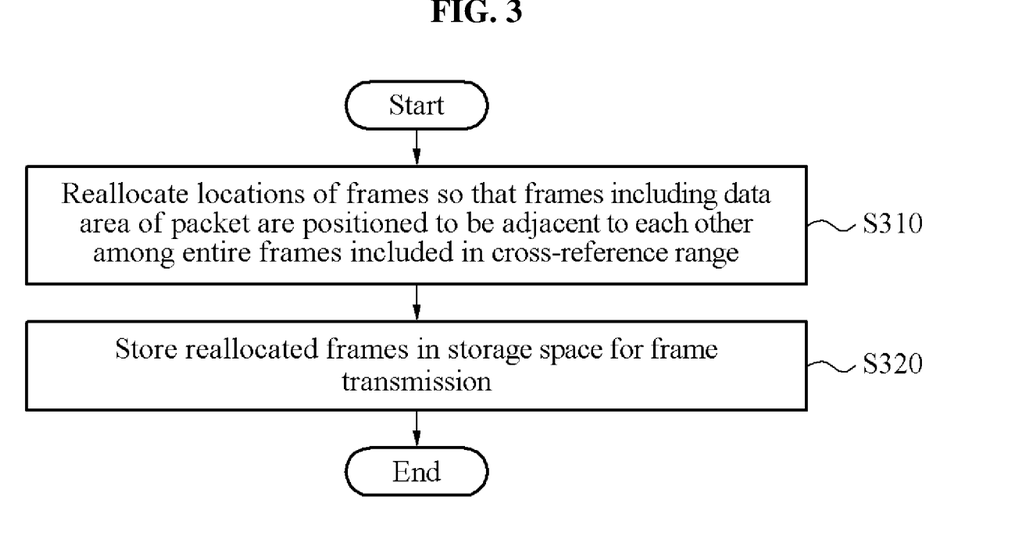
FIGS. 3 and 4 illustrate examples of an operation of encrypting a packet in an encrypted packet transmission method of a communication system according to an example embodiment.
Figure 4:
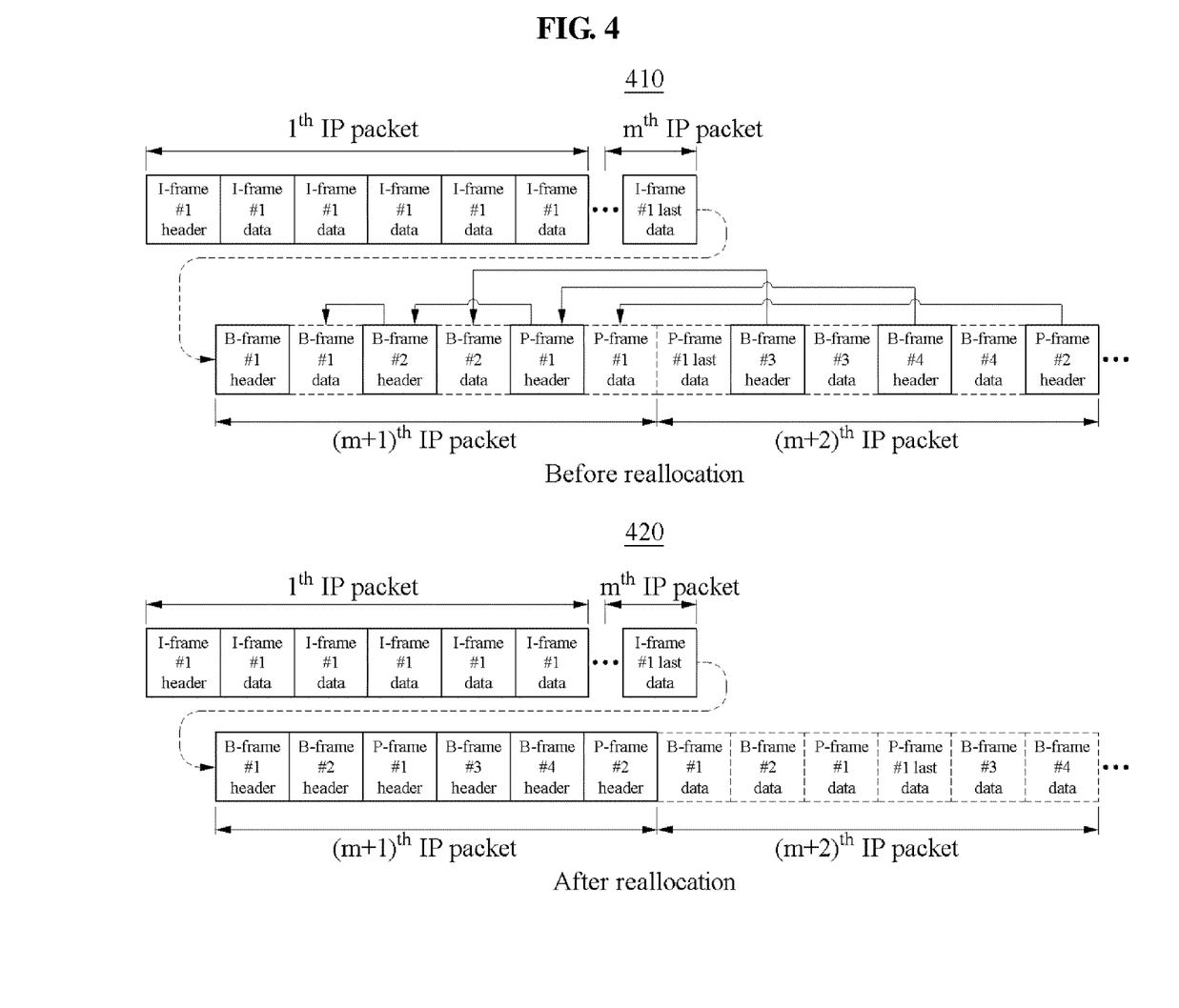

FIGS. 3 and 4 illustrate examples of an operation of encrypting a packet in an encrypted packet transmission method of a communication system according to an example embodiment.

Referring to FIG. 3, in operation S310, the packet transmission method may rearrange locations of frames so that frames including a data area of a packet are positioned to be adjacent to each other among the entire frames included in a cross-reference range. Referring to FIG. 4, the entire frames included in the cross-reference range are arranged, and frames included in an $(m+1)^{th}$ IP packet and an $(m+2)^{th}$ IP packet are arranged without considering a priority. Compared to a before-rearrangement, after a rearrangement, packets having a relatively high priority may be arranged as the $(m+1)^{th}$ IP packet and packets having a relatively low priority may be arranged as the $(m+2)^{th}$ IP packet. During the above process, there is no need to rearrange all of the packets and the packets may be selectively rearranged based on an importance of a packet.

Referring again to FIG. 3, in operation S320, the packet transmission method may store the rearranged frames in a storage space for a frame transmission. As described with FIG. 4, once packets having a relatively high priority are rearranged, the rearranged packets may be stored in the same storage space, such as a buffer or a memory, so that a packet may be transmitted based on a unit of frames having a cross-reference relationship. The packet stored in the storage space may be transmitted through a transmitter.

Figure 5:
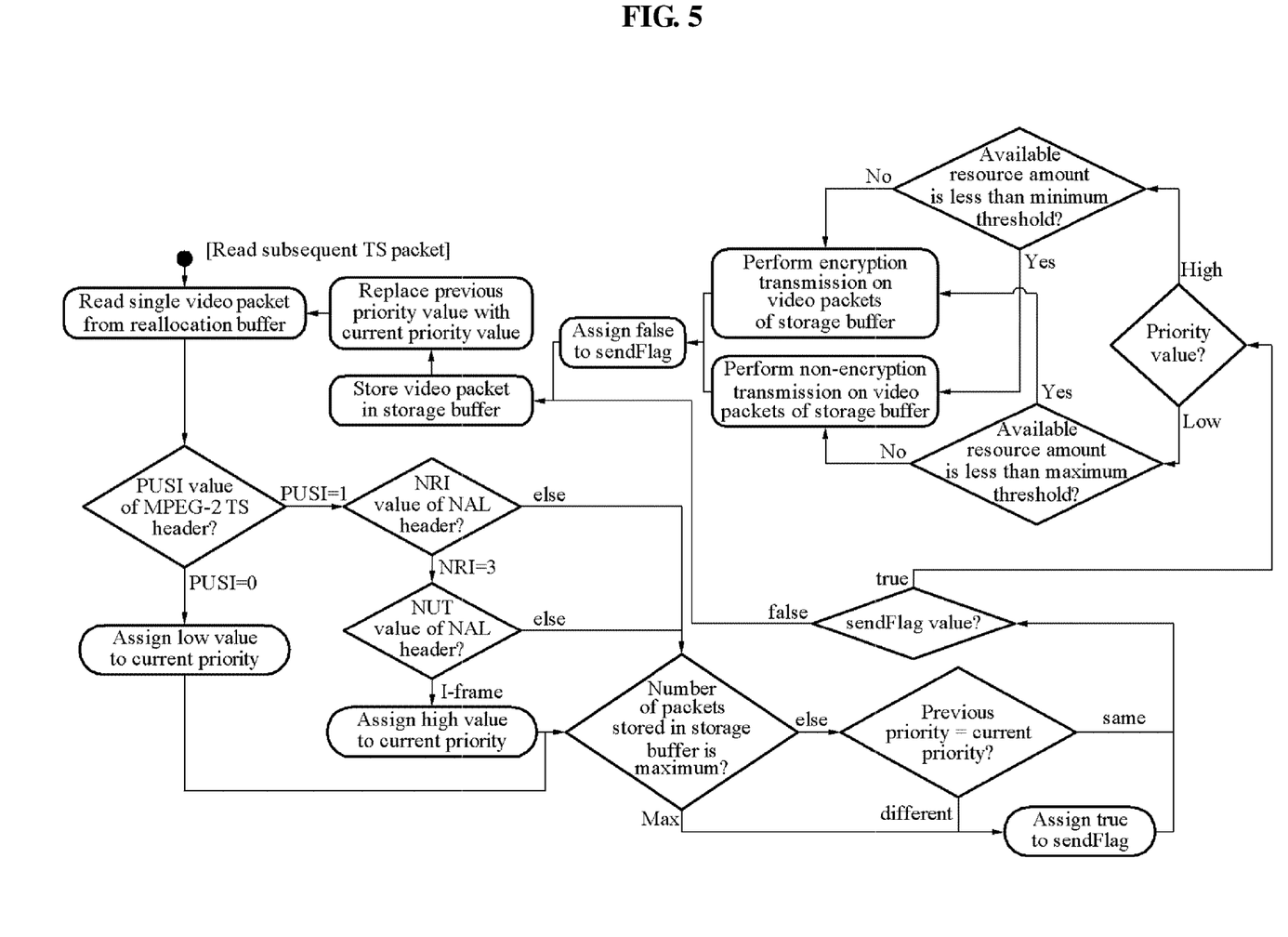
FIG. 5 is a flowchart illustrating an operation of selectively reallocating video packets based on an importance when determining a video packet according to an example embodiment.

FIG. 5 is a flowchart illustrating an operation of selectively reallocating video packets based on an importance when determining a video packet according to an example embodiment.

According to an example embodiment, an operation of identifying a packet based on a packet identification criterion may include an operation of determining a priority of the packet by verifying a value of an MPEG-2 TS header and a value of a NAL header. Referring to FIG. 5, once a processor receives video packets, the processor may write a serial number to each of the video packets for order restoration. The processor may read the video packets one by one and may perform a process of determining a type of a corresponding packet. To this end, the processor may check a process ID (PID) value of a packet header defined in an MPEG-2 TS standard and may verify whether the packet includes information corresponding to a PAT or a PMT.

According to an example embodiment, an operation of reallocating frames included in the identified packet and encrypting the packet in which the frames are rearranged may include an operation of storing the packet in a transmission buffer when the determined priority is greater than a desired value and storing the packet in a flush buffer when the determined priority is less than the desired value. When the read video packet corresponds to the PAT or the PMT, and in this instance, the video packet has a relatively high importance based on a parameter that stores the importance of the video packet, that is, a value assigned to a priority, the video packet may be duplicated to the transmission buffer. When the video packet has a relatively low importance, the video packet may be duplicated to the flush buffer. When the read packet does not correspond to the PAT or the PMT, a Nal_Ref_Idc (NRI) value of a NAL header defined in H.264/AVC and HEVC/H.265 may be checked. If the NRI value is 3, a Nal_Unit_Type (NUT) value of the NAR header may be checked again. When a current packet is determined to include a header of an I-frame based on the NUT value, a relatively high value may be assigned to a priority parameter and video packets of the flush buffer may be duplicated to the transmission buffer. Subsequently, the read video packet maybe duplicated to the transmission buffer. If the NRI value is not 3, the currently read video packet may be duplicated to the transmission buffer. A subsequently located single packet may be read from a reception buffer. The flow of FIG. 4 may be repeated until reception of a video packet is terminated.

Figure 6:
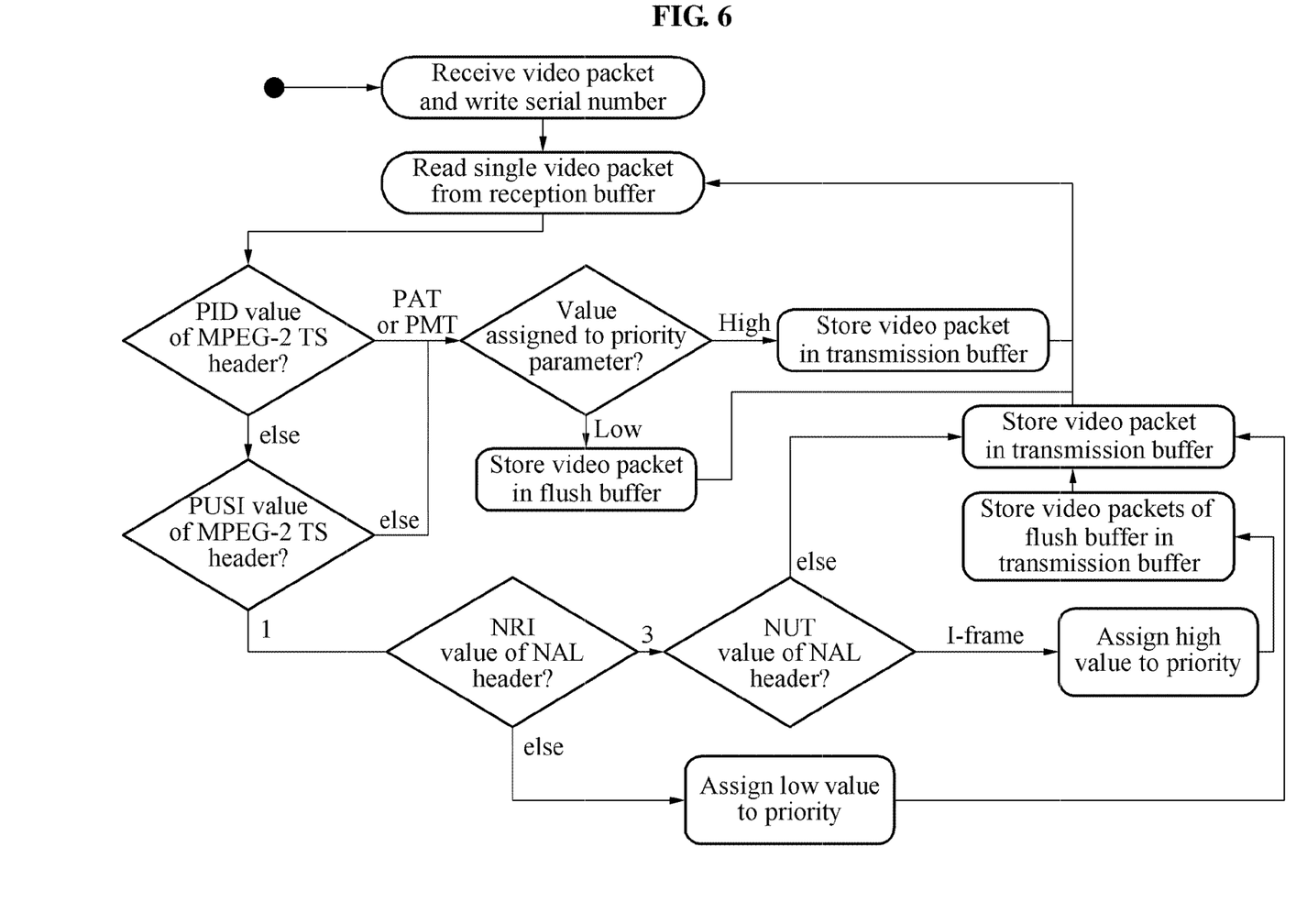
FIG. 6 is a flowchart illustrating an operation of controlling an encryption target video based on an available resource amount when transmitting a video packet to which an encrypted packet transmission method of a communication system is applied according to an example embodiment.

FIG. 6 is a flowchart illustrating an operation of controlling an encryption target video based on an available resource amount when transmitting a video packet to which an encrypted packet transmission method of a communication system is applied according to an example embodiment.

According to an example embodiment, the encrypted packet transmission method of the communication system may read rearranged and thereby stored video packets from a storage space and may identify video information corresponding to a start point of a unit of video frames having a cross-reference relationship. To this end, information corresponding to a header of an I-frame may be used based on payload unit start indicator (PUSI) information included in an MPEG-2 TS packet header and NRI and NUT information of a NAL header defined in H.264/AVC or HEVC/H.265 Important video packets requiring encryption transmission may be dynamically selected based on an available resource amount.

Referring to FIG. 6, a video packet transmitter may read video packets from a reception buffer one by one, and may perform a process of determining a type of a corresponding packet. To this end, the video packet transmitter may check a PUSI value of a packet header defined in an MPEG-2 TS standard. If the PUSI value is zero and a packet type is not P-frame or B-frame data, a current video packet may be duplicated to a transmission buffer. If the packet type is the P-frame or B-frame data, a relatively low value may be assigned to a priority parameter and zero may be assigned to a PB header counter parameter.

According to an example embodiment, an operation of identifying the packet based on a packet identification criterion may include an operation of determining a priority of the packet by verifying a value of an MPEG-2 TS header and a value of a NAL header. If the PUSI value is 1, an NRI value of an NAL header defined in H.264/AVC H.264/AVC and HEVC/H.265. If the NRI value is 3, an NUT value of the NAL header may be checked. When a current packet is determined to include a header of an I-frame, a relatively high value may be assigned to a priority parameter. In a normal situation in which an available resource amount is sufficient, video packets of the transmission buffer may be transmitted through an encryption protocol, for example, an SSL protocol. In a situation in which the available resource amount is insufficient, video packets of the transmission buffer may be transmitted through an encryption protocol, for example, a TCP. When the current video packet is determined to not include the header of the I-frame and a relatively high value is determined to be assigned to the priority parameter, the current video packet may be duplicated to the transmission buffer. If the relatively low value is determined to be assigned, non-encryption transmission may be performed on video packets of the transmission buffer.

If the NRI value is not 3, a PB header counter may increase by one and the current video packet may be duplicated to the transmission buffer.

Once the current video packet is duplicated to the transmission buffer in each routine, whether a value of the PB header counter parameter is a maximum value may be verified. If the value of the PB header counter parameter matches the maximum value, the value of the BP header counter may be initialized to zero and a relatively low value may be assigned to a value of the priority parameter. For example, if a group of pictures (GOP) is set as 30, 29 corresponding to a total number of P-frames and B-frames excluding a single I-frame may be set as the maximum value.

If the value of the PB header counter parameter is not the maximum value, a number of video packets present in the transmission buffer may be counted without performing the above process.

According to an example embodiment, an operation of reallocating frames included in the identified packet and encrypting the packet in which the frames are rearranged may include an operation of verifying a priority of the packet and an operation of encrypting and transmitting the packet when an available resource amount is greater than a minimum threshold or less than a maximum threshold, and performing a non-encryption transmission on the packet when the available resource amount is less than the minimum threshold or greater than the maximum threshold. After a routine of verifying whether the value of the PB header counter parameter is the maximum value, a number of video packets present in the transmission buffer may be counted. If the counted number of video packets is a maximum value that may be included in a single IP packet, a value of the priority parameter may be checked. When the value of the priority parameter is a relatively high value, and when state information of a resource use monitoring device or an external input device represents a normal situation in which an available resource amount is sufficient, video packets of the transmission buffer may be transmitted through an encryption protocol, for example, an SSL protocol. In a situation in which the available resource amount is insufficient, non-encryption transmission may be performed on the video packets of the transmission buffer. When the value of priority parameter value is a relatively low value, the video packets may be transmitted through a non-encryption protocol, for example, a TCP. If the number of video packets present in the transmission buffer is not the maximum value, a subsequent video packet may be read from the reception buffer.

Figure 7:
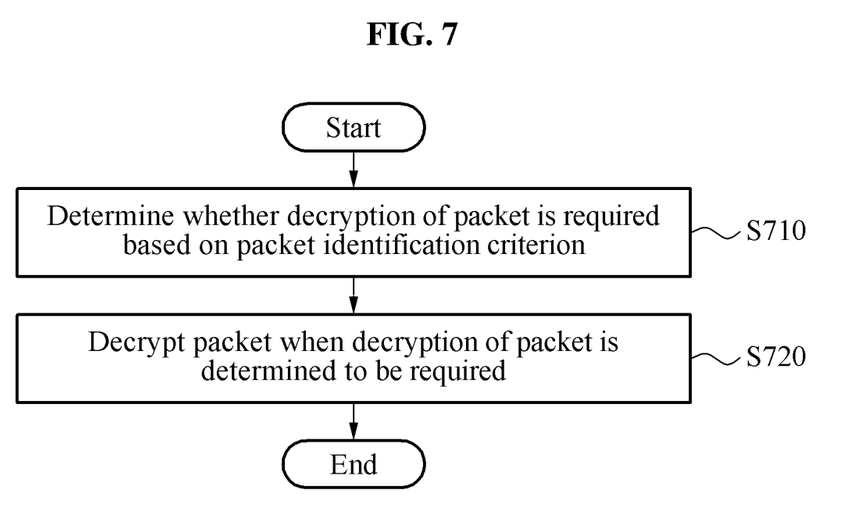
FIGS. 7 and 8 are flowcharts illustrating an operation of decoding a packet in an encrypted packet reception method of a communication system according to an example embodiment.
Figure 8:
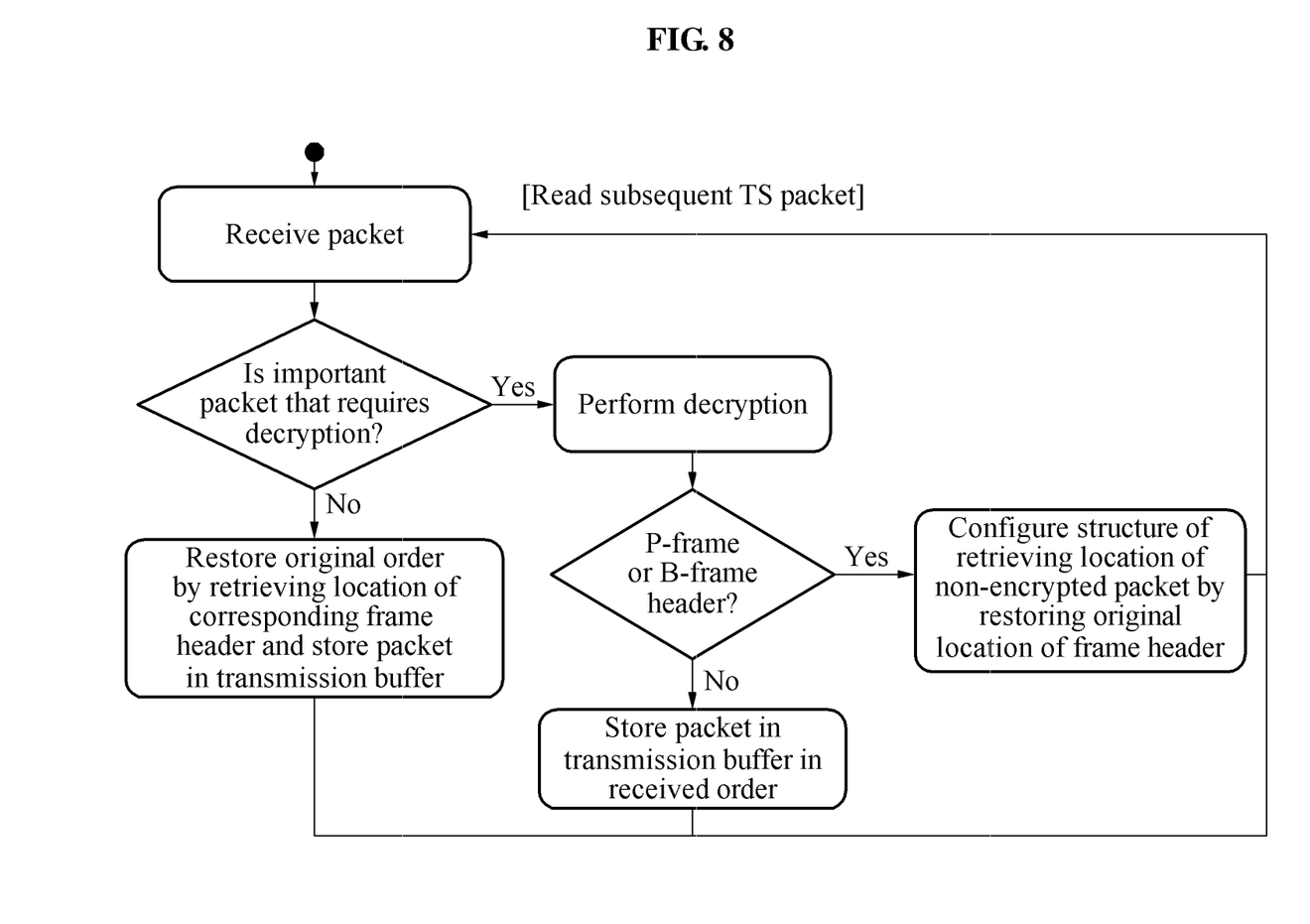

FIGS. 7 and 8 are flowcharts illustrating an operation of decoding a packet in an encrypted packet reception method of a communication system according to an example embodiment.

In operation S710, whether decryption of a packet is required may be determined based on a packet identification criterion of the packet. Referring to FIG. 8 for understanding, a packet identifier may be determined based on the packet identification criterion and whether the packet is encrypted may be determined. When the packet is an important packet having a relatively high priority requiring decryption, decryption of the packet may be performed. When the packet has a relatively low priority, an original order may be restored by retrieving a location of a corresponding frame header and the packet may be stored in a transmission buffer.

In operation S720, the packet may be decrypted when the decryption of the packet is determined to be required. According to an example embodiment, whether a type of the packet corresponds to a P-frame or B-frame header may be determined. When the packet corresponds to the P-frame or B-frame header, a structure for retrieving a location of a non-encrypted packet by restoring an original location may be configured. Otherwise, a packet may be stored in the transmission buffer in received order. Referring to FIG. 8, once the above process is terminated, a process of receiving a packet is repeated to read a subsequent packet. Received data may be transferred to an external output device.

Figure 9:
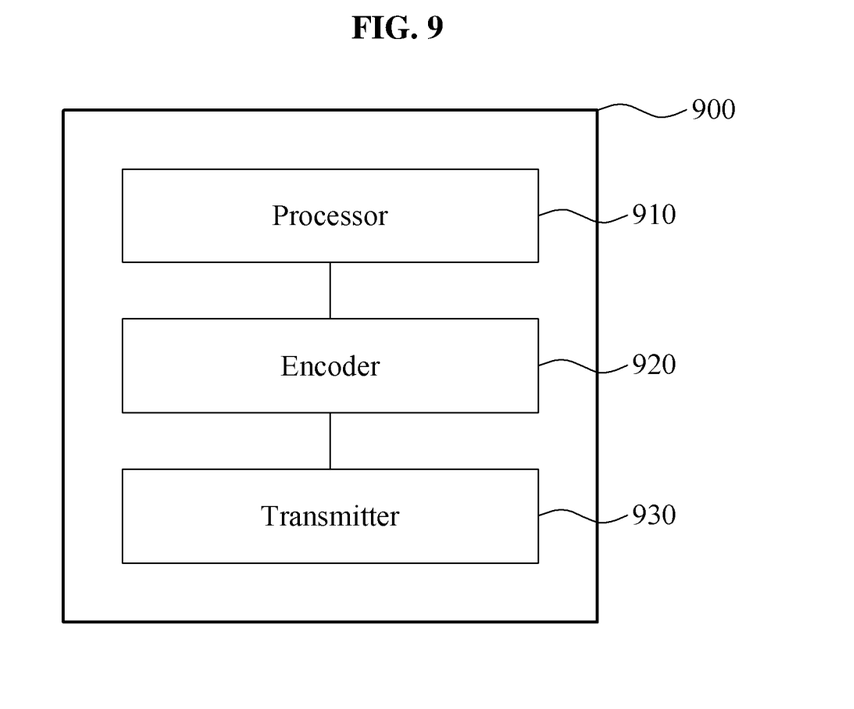
FIG. 9 is a block diagram illustrating a configuration of a packet transmission apparatus of a communication system according to an example embodiment.

FIG. 9 is a block diagram illustrating a configuration of a packet transmission apparatus of a communication system according to an example embodiment.

Referring to FIG. 9, a packet transmission apparatus 900 of a communication system may include a processor 910, an encoder 920, and a transmitter 930. The processor 910 may determine whether to perform a packet identification process or a packet encryption process based on a remaining system resource amount, and may identify the packet based on a packet identification criterion when the packet identification process and the packet encryption process are determined to be performed. Even in this case, the packet identification criterion may be recognized as the same concept as a packet ID on the communication system and may indicate each of identifiers assigned to packets in a multiplexed transmission flow, respectively. When multiplexing and transmitting a plurality of channel signals using a single transmission line, the communication system may independently compress and packetize each of the channel signals and then may multiplex packets and transmit the multiplexed packets. Here, the same packet identifier (PID) may be assigned to a packets corresponding to a single channel and be distinguished from a packets of another channel.

The encoder 920 may rearrange frames of the packet based on a result of identifying the packet and may encrypt the packet in which the frames are rearranged. The transmitter 930 may transmit the encrypted packet. Once an identified specific packet is encrypted, encryption transmission may be performed by applying an encryption protocol, for example, an SSL protocol, or an encryption algorithm, for example, an AES algorithm. Non-encryption transmission may be performed on a packet corresponding to a packet identification criterion that does not require encryption transmission. The packet rearrangement and encryption process is the same as the aforementioned encrypted packet transmission method of the communication system and a further description is omitted.

Figure 10:
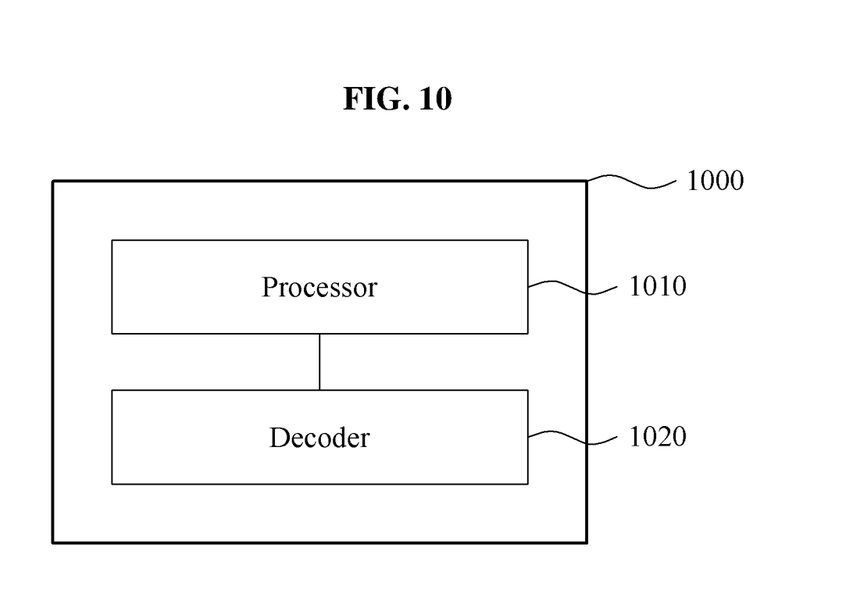
FIG. 10 is a block diagram illustrating a configuration of a packet reception apparatus of a communication system according to an example embodiment.

FIG. 10 is a block diagram illustrating a configuration of a packet reception apparatus of a communication system according to an example embodiment. Referring to FIG. 10, a packet reception apparatus 1000 of a communication system may include a processor 1010 and a decoder 1020.

The processor 1010 may determine whether decryption of a packet is required based on a packet identification criterion of the packet. The processor 1010 may determine a packet ID based on the packet identification criterion and may determine whether the packet is encrypted. When the packet is an important packet having a relatively high priority requiring decryption, the processor 1010 may perform decryption of the packet. When the packet has a relatively low priority, the processor 1010 may restore an original order by retrieving a location of a corresponding frame header and may store the packet in a transmission buffer.

When the decryption of the packet is determined to be required, the decoder 1020 may decrypt the packet based on the packet identification criterion. The decoder 1020 may determine whether the packet corresponds to a P-frame or B-frame header and may configure a structure for retrieving a location of a non-encrypted packet by restoring an original location of a frame header when the packet corresponds to the P-frame or B-frame header. Otherwise, the decoder 1020 may store a packet in the transmission buffer in received order. Referring to FIG. 8, once the above process is terminated, a process of receiving a packet is repeated to read a subsequent packet. Received data may be transferred to an external output device. According to another example embodiment, the packet identification criterion may be associated with a level of security required for transmission of the packet. An importance of the packet may be determined based on the required level of security and whether to encrypt the packet may be determined based on the determined importance.

A number of example embodiments have been described above. Nevertheless, it should be understood that various modifications may be made to these example embodiments.

For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A packet transmission method of a communication system, the method comprising:
    identifying a packet based on a packet identification criterion;
    reallocating frames included in the identified packet, and encrypting the packet in which the frames are rearranged; and
    transmitting the encrypted packet,
    wherein the encrypting comprises:
        reallocating locations of the frames so that frames including a data area of the packet are positioned to be adjacent to each other among the entire frames included in a cross-reference range; and
        storing the rearranged frames in a storage space for a frame transmission, and
    wherein the identifying of the packet based on the packet identification criterion comprises determining a priority of the packet by verifying a value of an MPEG-2 TS header and a value of a NAL header, and
    the reallocating of the frames and the encrypting of the packet comprises:
        verifying whether the priority of the packet is greater than a desired value; and
        encrypting and transmitting the packet when an available resource amount is greater than a minimum threshold or less than a maximum threshold, and performing a non-encryption transmission on the packet when the available resource amount is less than the minimum threshold or greater than the maximum threshold, in response to the priority of the packet being verified to be greater than the desired value.

2. The method of claim 1, wherein the packet identification criterion is associated with header information of the packet.

3. The method of claim 2, wherein the header information is compatible with at least one of a network abstraction layer (NAL) header format of an H.264/advanced video coding (AVC) standard and a NAL header format of a high efficiency video coding (HEVC)/H.265 standard.

4. The method of claim 2, wherein the header information is compatible with a header format of an MPEG-2 transport stream (TS) standard.

5. The method of claim 1, wherein the packet identification criterion is associated with a level of security required for transmission of the packet.

6. The method of claim 1, wherein the identifying of the packet based on the packet identification criterion comprises determining a priority of the packet by verifying a value of an MPEG-2 TS header and a value of a NAL header, and
    the reallocating of the frames and the encrypting of the packet comprises storing the packet in a transmission buffer when the determined priority is greater than a desired value and storing the packet in a flush buffer when the determined priority is less than the desired value.

7. The method of claim 1, further comprising:
   determining whether decryption of a packet is required based on a packet identification criterion of the packet; and
   decrypting the packet based on the packet identification criterion when the decryption of the packet is determined to be required.

8. The method of claim 7, wherein an identifier of the packet is associated with header information of the packet.

9. The method of claim 7, wherein the packet identification criterion is associated with a level of security required for transmission of the packet.

* * * * *